US008325668B2

(12) United States Patent
Miki et al.

(10) Patent No.: US 8,325,668 B2
(45) Date of Patent: Dec. 4, 2012

(54) COMMUNICATIONS CONTROL METHOD, SIGNAL GENERATING APPARATUS, AND RADIO COMMUNICATIONS APPARATUS INCLUDING THE SIGNAL GENERATING APPARATUS IN MOBILE COMMUNICATIONS SYSTEM (75) Inventors: Nobuhiko Miki, Yokohama (JP); Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 296 days.

(21) Appl. No.: 12/673,342

(22) PCT Filed: Aug. 13, 2008

(86) PCT No.: PCT/JP2008/064549
§ 371 (c)(1),
(2), (4) Date: May 18, 2010

(87) PCT Pub. No.: WO2009/022711
PCT Pub. Date: Feb. 19, 2009

(65) Prior Publication Data
US 2011/0194416 A1 Aug. 11, 2011

(30) Foreign Application Priority Data
Aug. 14, 2007 (JP) .................. 2007-211602

(51) Int. Cl.
H04W 4/00 (2009.01)
H04J 1/16 (2006.01)
G08C 25/02 (2006.01)
(52) U.S. Cl. ......... 370/329; 370/330; 370/241; 714/748
(58) Field of Classification Search .................. 370/241, 370/242, 328, 329, 330; 714/748
See application file for complete search history.

(56) References Cited

U.S. PATENT DOCUMENTS

| 7,873,364 B2* | 1/2011 | Park et al. ...................... 455/450 |
| 2008/0037664 A1* | 2/2008 | Yang et al. ..................... 375/260 |
| 2008/0081651 A1* | 4/2008 | Kuroda et al. ................ 455/509 |
| 2008/0253326 A1* | 10/2008 | Damnjanovic ................ 370/329 |
| 2010/0014430 A1* | 1/2010 | Oka ............................. 370/242 |
| 2010/0142491 A1* | 6/2010 | Dubreuille et al. ........... 370/336 |

OTHER PUBLICATIONS

LG Electronics, "Modifications of Uplink Synchronous HARQ scheme," 3GPP TSG RAN WG1 #47bis, R1-070245, Sorrento, Italy, Jan. 15-19, 2007, 5 pages.
Nokia, "Implicit ACK/NAK for LTE DL," 3GPP TSG-RAN WG1 Meeting #49bis, R1-072996 (R1-072306), Orlando, USA, Jun. 25-29, 2007, 2 pages.
International Search Report issued in PCT/JP2008/064549, mailed on Sep. 22, 2008, with translation, 9 pages.
Written Opinion issued in PCT/JP2008/064549, mailed on Sep. 22, 2008, 4 pages.

* cited by examiner

*Primary Examiner* — Ricky Ngo
*Assistant Examiner* — Paul H Masur
(74) *Attorney, Agent, or Firm* — Osha Liang LLP (57) ABSTRACT A method of controlling communications includes determining whether reception of information from a mobile station is normal, generating a first signal when it is determined to be normal, and generating a second signal when it is determined to be abnormal. When the mobile station is instructed to retransmit information using a first radio resource used in previous transmission, and when it is determined to be abnormal and when the mobile station is instructed to retransmit the information using a second radio resource different from the first radio resource, the method generates the first signal and a third signal including information on the second radio resource, and transmits any one of the first signal, the second signal, and a combination of the first signal and the third signal, the first signal and the second signal and the combination of the first signal and the third signal being generated.

3 Claims, 7 Drawing Sheets

FIG.1

| ACK/NACK | Uplink Resource Grant | RECEIVED STATUS AT BASE STATION /RETRANSMISSION REQUEST |
|---|---|---|
| +1 | NOT TRANSMITTED | NORMAL/NO RETRANSMISSION REQUEST |
| −1 | NOT TRANSMITTED | ABNORMAL/REQUEST RETRANSMISSION USING SAME RESOURCE |
| −1 | TRANSMITTED | ABNORMAL/REQUEST RETRANSMISSION USING DIFFERENT RESOURCE |

FIG.2

| ACK/NACK | Uplink Resource Grant | RECEIVED STATUS AT BASE STATION /RETRANSMISSION REQUEST |
|---|---|---|
| +1 | NOT TRANSMITTED | NORMAL/NO RETRANSMISSION REQUEST |
| −1 | NOT TRANSMITTED | ABNORMAL/REQUEST RETRANSMISSION USING SAME RESOURCE |
| +1 | TRANSMITTED | ABNORMAL/REQUEST RETRANSMISSION USING DIFFERENT RESOURCE |

| ACK/NACK | Uplink Resource Grant | RECEIVED STATUS AT BASE STATION /RETRANSMISSION REQUEST |
|---|---|---|
| +1 | TRANSMITTED | NORMAL/REQUEST RETRANSMISSION OF FOLLOWING INFORMATION (PACKET) |
| −1 | NOT TRANSMITTED | NORMAL/NO RETRANSMISSION REQUEST ABNORMAL/REQUEST RETRANSMISSION USING SAME RESOURCE |
| +1 | TRANSMITTED | ABNORMAL/REQUEST RETRANSMISSION USING DIFFERENT RESOURCE | ial # COMMUNICATIONS CONTROL METHOD, SIGNAL GENERATING APPARATUS, AND RADIO COMMUNICATIONS APPARATUS INCLUDING THE SIGNAL GENERATING APPARATUS IN MOBILE COMMUNICATIONS SYSTEM

CROSS-REFERENCE TO RELATED APPLICATIONS

The present application claims priority based on Japanese Patent Application No. 2007-211602 filed on Aug. 14, 2007 with the Japanese Patent Office, the entire contents of which are hereby incorporated herein by reference.

BACKGROUND OF THE INVENTION

1. Field of the Invention

The present invention relates to a communications control method, a signal generating apparatus, and a radio communications apparatus including the signal generating apparatus in a mobile communications system.

2. Description of the Related Art

Within a framework of 3GPP (Third Generation Partnership Project), it is expected to be possible to transmit to a mobile station at the time of transmitting downlink acknowledgement information on a signal received by a base station, uplink radio resource allocation information. Making it possible to transmit, from the base station to the mobile station, together with the acknowledgement information, the radio resource allocation information allows the mobile station to retransmit, using a different radio resource, already-transmitted information which could not be received normally by the base station, so that an efficient utilization of uplink radio resources is achieved and a reliable retransmission of the information is expected.

SUMMARY OF THE INVENTION

However, in the above-described technical field of transmitting the information on the radio resource allocation, a technique is generally expected which realizes an improved efficiency of system resources through the use of the information.

Thus, the object of the present invention is to provide a communications control method, a signal generating apparatus, and a radio communications apparatus including the signal generating apparatus that make it possible to efficiently utilize radio resource allocation information which is allowed to be transmitted with acknowledgement information.

In order to achieve the object as described above, a communications control method is provided according to a first mode of the present invention, the method, including a step of determining whether reception of information from a mobile station is normal; a step of generating a first signal when it is determined to be normal, generating a second signal when it is determined to be abnormal and when the mobile station is instructed to retransmit information using a first radio resource used in previous transmission, and when it is determined to be abnormal and when the mobile station is instructed to retransmit the information using a second radio resource different from the first radio resource, generating the first signal and a third signal including information on the second radio resource; and a step of transmitting anyone of the first signal, the second signal, and a combination of the first signal and the third signal, the first signal, the second signal, and the combination of the first signal and the third signal being generated by the step of signal generating. The step of generating may be arranged to further include a step of generating, when it is determined to be normal, in addition to the first signal, a fourth signal for reporting, to the mobile station, a third radio resource to be used in following transmission.

A signal generating apparatus is provided according to a second mode of the present invention, the apparatus, including a first signal generator which generates a first signal when reception of information from a transmission source is normal; a second signal generator which, when the reception of the information from the transmission source is abnormal and the transmission source is instructed to conduct retransmission of the information using a first radio resource used in previous transmission, generates a second signal for instructing the retransmission; and a third signal generator which, when the reception of the information from the transmission source is abnormal and the transmission source is instructed to retransmit the information using a second radio resource different from the first radio resource, generates the first signal, and a third signal including information on the second radio resource. The signal generating apparatus may be arranged to further include a fourth signal generator which, when the reception of the information from the transmission source is normal, generates, in addition to the first signal, a fourth signal for reporting to the transmission source a third radio resource to be used in following transmission.

A radio communications apparatus is provided according to a third mode of the present invention, the apparatus, including the signal generating apparatus of the second mode; and a transmitter which transmits one of the first signal, the second signal, and a combination of the first signal and the third signal, the first signal, the second signal, and the combination of the first signal and the third signal being generated by the signal generating apparatus. The radio communications apparatus may be arranged to further include a fourth signal generator which, when the reception of the information from the transmission source is normal, generates, in addition to the first signal, a fourth signal for reporting to the transmission source a third radio resource to be used in following transmission.

According to the present invention, a communications control method, a signal generating apparatus, and a radio communications apparatus including the signal generating apparatus are provided that make it possible to efficiently utilize uplink radio resource allocation information which is allowed to be transmitted together with downlink acknowledgement information.

DETAILED DESCRIPTION

Description of Notations

400 base station; 404 adaptive/non-adaptive determining unit; 406 allocation resource block determining unit; 408 ACK/NACK generator; 410 user control signal generator; 412 encoder; 414 data modulator; 416 multiplexer; 500 base station; 502 adaptive/non-adaptive determining unit; 504 broadcast channel generator; 506 encoder; 508 data modulator; 510 user data generator; 512 encoder; 514 data modulator; 516 multiplexer

BEST MODE OF CARRYING OUT THE INVENTION

A First Embodiment

First, a method is described of signaling of ACK/NACK information and uplink resource allocation information (below-called "a radio resource grant") that have been considered by the present inventors in the course of leading up to the present invention.

Figure 1:
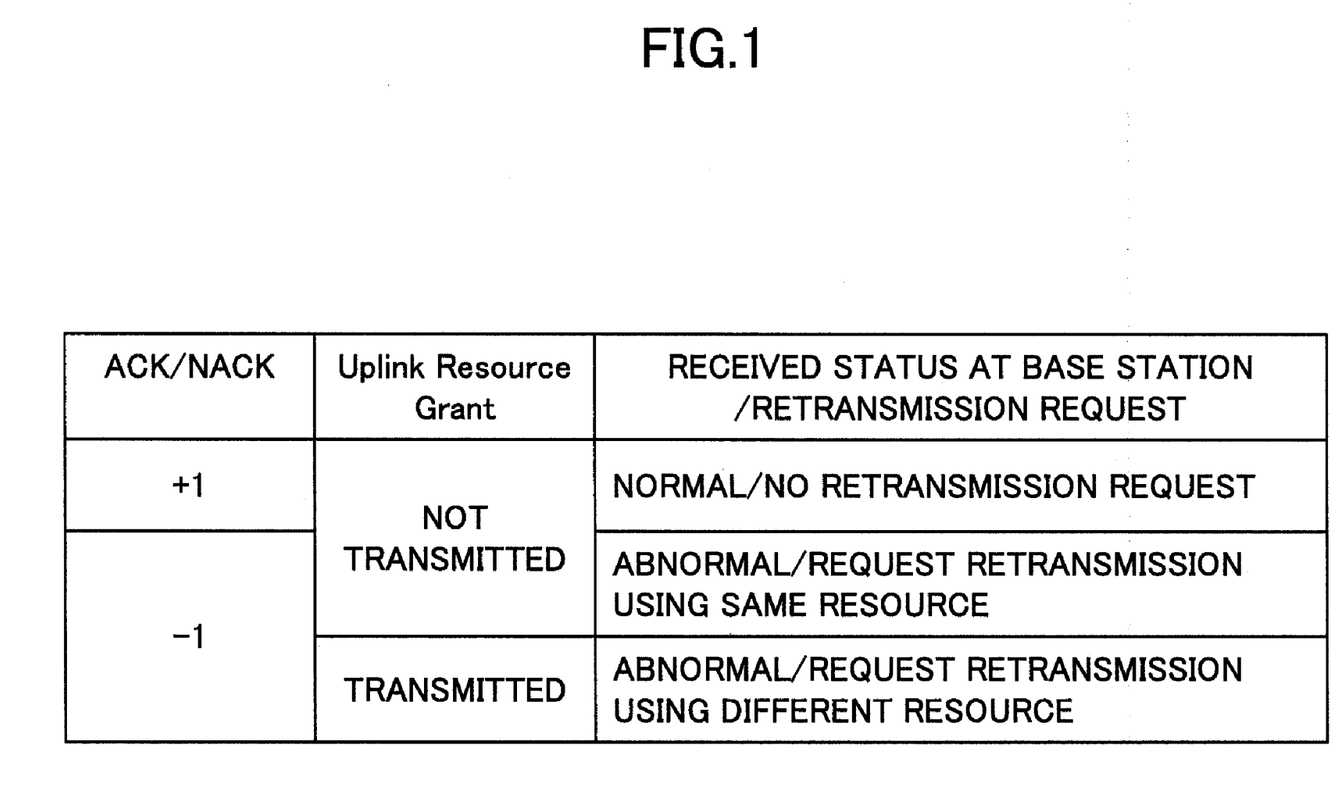
FIG. 1 is a chart illustrating an example of a signaling method for ACK/NACK and uplink resource allocation.

FIG. 1 shows what information is transmitted to a mobile station by a base station which received information from the mobile station, according to a received status. The base station transmits a "−1" as NACK information to the mobile station when it fails to properly receive information (a packet) from the mobile station. Here, as illustrated in FIG. 1, when the base station instructs the mobile station to retransmit previously transmitted information (below called already-transmitted information) using the same radio resource as a radio resource used in the previous transmission, the radio resource grant is not transmitted. Moreover, when the base station instructs the mobile station to retransmit the already-transmitted information using a radio resource different from the radio resource used in the previous transmission, the radio resource grant (corresponding to a so-called adaptive ARQ) is transmitted.

According to this signaling method, even when the base station transmits "−1" and the radio resource grant to the mobile station, an error may occur such that only the "−1" ends up getting transmitted, for example. Then, the mobile station may determine that the resource grant has not been transmitted. In this case, the mobile station will use, for retransmitting the already-transmitted information, the same radio resource used in the previous transmission. Thus, the base station cannot recognize information transmitted using a radio resource different from an own-specified radio resource. Moreover, this also represents the mobile station using a radio resource allocated to another mobile station, possibly causing a collision with said another mobile station and interfering with the operation of the base station.

The present inventors, as a result of having diligently considered avoiding such a situation as described above, have come to the conclusion that a combination of the "−1" and the radio resource grant should be avoided. A signaling method which may overcome the above described problem is explained with reference to FIGS. 2 and 3.

Figure 2:
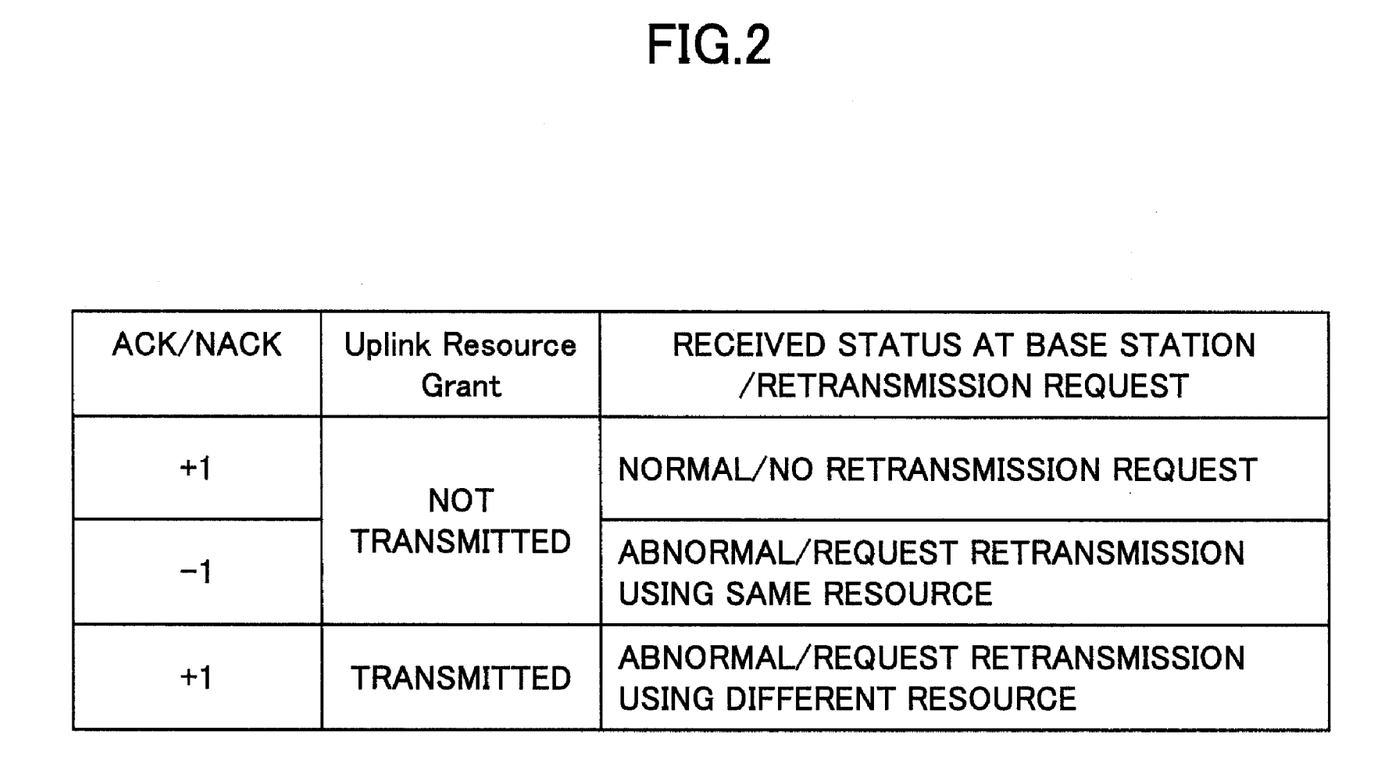
FIG. 2 is a chart illustrating a signaling method for ACK/NACK and uplink resource allocation according to the present embodiment.
Figure 3:
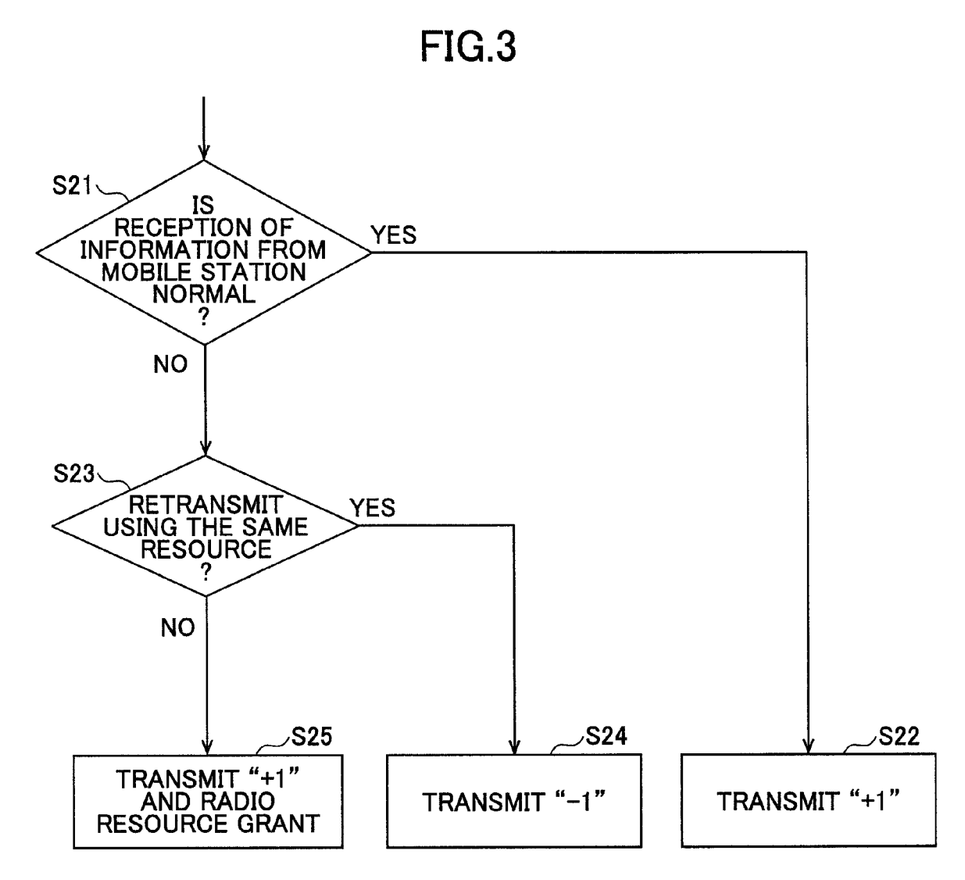
FIG. 3 is a flow chart explaining the signaling method in FIG. 2.

As shown in FIG. 2, when instructing to retransmit already-transmitted information using the same radio resource used in a previous transmission, the base station transmits only "−1" and does not transmit a radio resource grant. In other cases, "+1" is transmitted. In other words, the base station, first, receives information transmitted from a mobile station and determines whether the information has been received normally (FIG. 3, step S21). Based on the determining, if normal (step S21: YES), "+1" is transmitted to the mobile station as ACK information (step s22).

Conversely, if the determined result is abnormal (step S21: NO), it is determined whether the mobile station is to be made to retransmit the already-transmitted information using the same radio resource (step S23). While not limited to this, the determination may be performed based on what allocation is effective in order to efficiently use the radio resource. The base station, when it has determined to request retransmission using the same radio resource, transmits "−1" to the mobile station as NACK information (corresponds to a so-called non-adaptive ARQ) (step s24). On the other hand, the base station, when it has determined to request retransmission using a different radio resource for reasons that it can effectively use the radio resource, that it can expect more reliable retransmission, etc., transmits "+1" and the radio resource grant to the mobile station (corresponds to a so-called adaptive ARQ) (step s25).

In this way, the mobile station can always determine that it is being instructed to retransmit already-transmitted information using the same radio resource. In other words, when the "−1" is received, the mobile station does not retransmit already-transmitted information using a different radio resource. Therefore, a situation is avoided such that, even when the base station has instructed to retransmit already-transmitted information using a radio resource different from a radio resource used in a previous transmission, the mobile station ends up transmitting the already-transmitted information using the radio resource used for the previous transmission.

On the other hand, when the "+1" is received, the mobile station always checks for the presence of the radio resource grant. As a result of the checking, when it is determined that the radio resource grant is present, the mobile station extracts, from the radio resource grant, radio resource information specified by the base station, and uses the extracted radio resource information to retransmit already-transmitted information. On the contrary, when it is determined that the radio resource grant is not present, the mobile station does not transmit anything.

Even when the base station has transmitted "+1" and the radio resource grant, the mobile station may falsely perceive that the radio resource grant has not been transmitted. In this case, the mobile station, which is supposed to retransmit the already-transmitted information in the first place, ends up not retransmitting. While inconvenient for the mobile station, such situation is beneficial in that it does not adversely affect the operation of the base station and it does not cause a collision with another mobile station. In other words, as long as the mobile station receives the "+1", regardless of the result of the checking for the presence of the radio resource grant, the communications system will not be adversely affected. In light of the fact that, with the signaling method in FIG. 1, the system may be adversely affected depending on the result of the checking for the presence of the radio resource grant when the "−1" is received, the advantages of the signaling method shown in FIGS. 2 and 3 can be understood.

As described above, the signaling method according to the embodiment of the present invention makes it possible to reduce or avoid the problems which may be caused when the mobile station falsely perceives what is instructed from the base station.

According to the signaling method shown in FIGS. 2 and 3, when the base station ends up transmitting "+1" even when it fails to receive the information from the mobile station normally, it may appear that ACK is transmitted at an abnormal time. On this point, the "ACK" in the present method is different from ACK which is conventionally meant. However, at the time of filing the subject application, there is no suitable term for the ACK of the present method and also a newly-created term may lead to confusion with other terms. Thus, the term ACK is being used herein. Therefore, in the event that a term representing ACK of the present method comes to be widely used in the technical field in the future, even if such a term is not ACK, it should not be construed that the signals are different when the terms are different.

Below is explained a base station to which communications control methods according to the present invention is applied.

Figure 4:
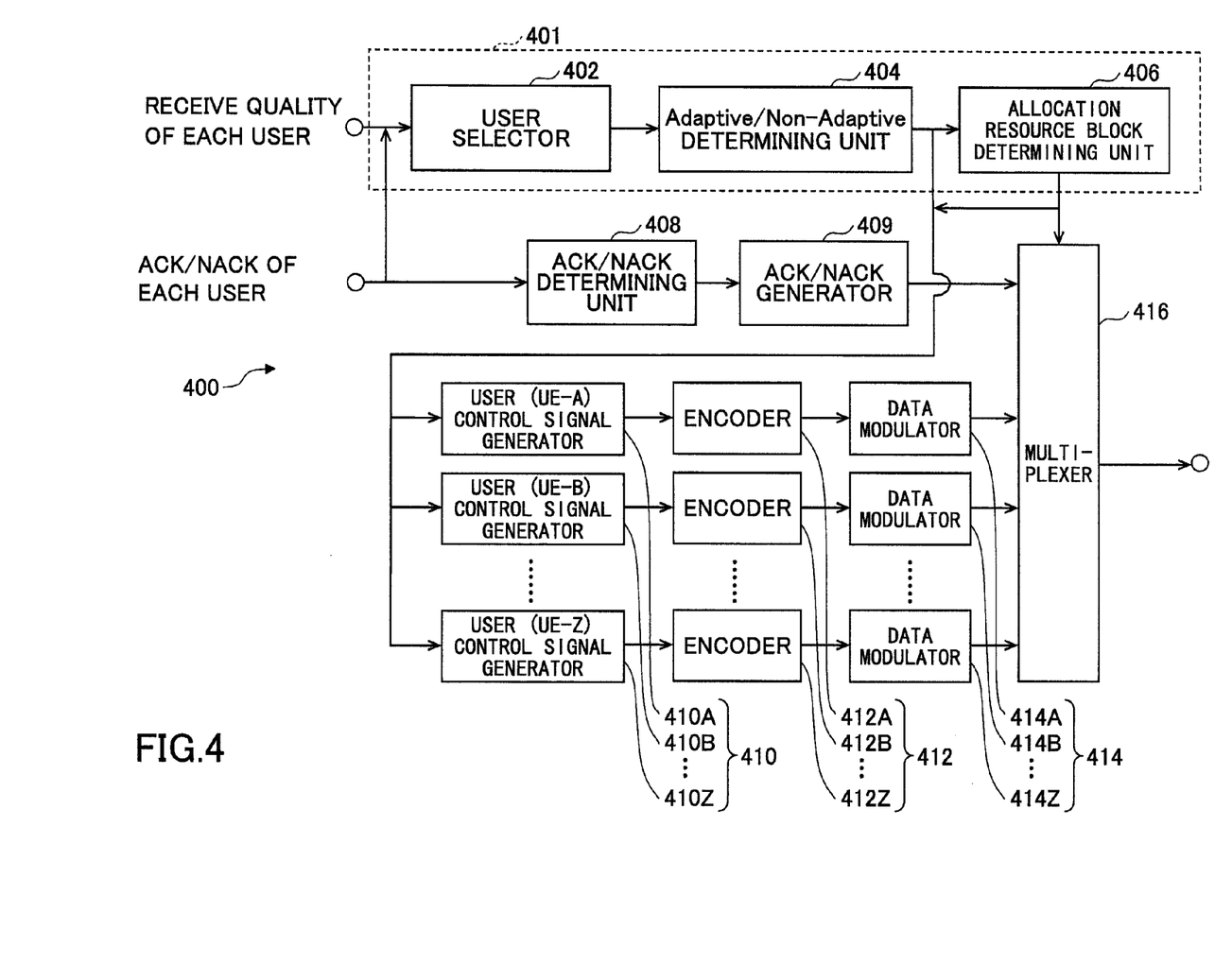
FIG. 4 is a schematic block diagram illustrating a configuration of a base station according to an embodiment of the present invention.

With reference to FIG. 4, a configuration of a base station according to one embodiment of the invention is explained.

As shown in FIG. 4, a base station 400 according to a first embodiment of the present invention includes a base station scheduler 401, an ACK/NACK determining unit 408; an ACK/NACK generator 409; user control signal generators 410 (410A, 410B-410Z), encoders 412 (412A, 412B-412Z), data modulators 414 (414A, 414B-414Z), and a multiplexer 416. The base station scheduler 401 includes a user selector 402, an adaptive/non-adaptive determining unit 404, and an allocation resource block determining unit 406.

Based on a signal indicating receive quality of multiple users present in the cell, and ACK/NACK information which indicates a received result of a signal from each of the users that is input into the user selector 402, the user selector 402 selects one of the users to which feedback information is to be transmitted and generates information (a user ID) which indicates the selected user. Moreover, the user selector 402 outputs the generated information to the adaptive/non-adaptive determining unit 404.

Using the information input from the user selector 402, the adaptive/non-adaptive determining unit 404 determines whether the adaptive ARQ or the non-adaptive ARQ is to be applied to the user. Moreover, the adaptive/non-adaptive determining unit 404 generates information indicating the determined result and outputs the generated information to the allocation resource block determining unit 406.

Based on information input from the adaptive/non-adaptive determining unit 404, the allocation resource block determining unit 406 allocates a radio resource to the user selected by the user selector 402, and, more specifically, also allocates, for the user to which the adaptive ARQ is to be applied, uplink radio resource allocation information. Then, the allocation resource block determining unit 406 outputs the allocation information to the multiplexer 416.

On the other hand, information indicating a determined result output from the adaptive/non-adaptive determining unit 404 and allocation information output from the allocation resource block determining unit 406 are input to the user control signal generator 410 corresponding to the user selected by the user selector 402. The control signal generator 410, to which these sets of information are input, generates a control signal based on the information sets and outputs the generated control signal to a corresponding encoder 412.

The encoder 412, to which the control signal is input, performs a predetermined encoding process on the control signal and outputs the encoded control signal to the corresponding data modulator 414. The data modulator 414 performs a predetermined modulation process on the input encoded control signal and outputs the modulated control signal to the multiplexer 416.

The ACK/NACK determining unit 408 inputs information on whether a received signal from each of the users applies to an ACK or a NACK, and based on the information, the ACK/NACK generator 409 generates one of signals of "+1", "−1", and "+1" and a radio resource grant according to FIG. 2. Moreover, the ACK/NACK generator 409 outputs the generated signal to the multiplexer 416.

Based on allocation information input from the allocation resource block determining unit 406, a control signal input from the data modulator 414, and a signal generated according to FIG. 2 that is input from the ACK/NACK generator 409, the multiplexer 416 generates a transmit signal to be transmitted to the base station. The transmit signal is output to an RF transmit circuit (not shown), and transmitted to the base station via a power amplifier and a duplexer (neither shown).

A Second Embodiment

Figure 5:
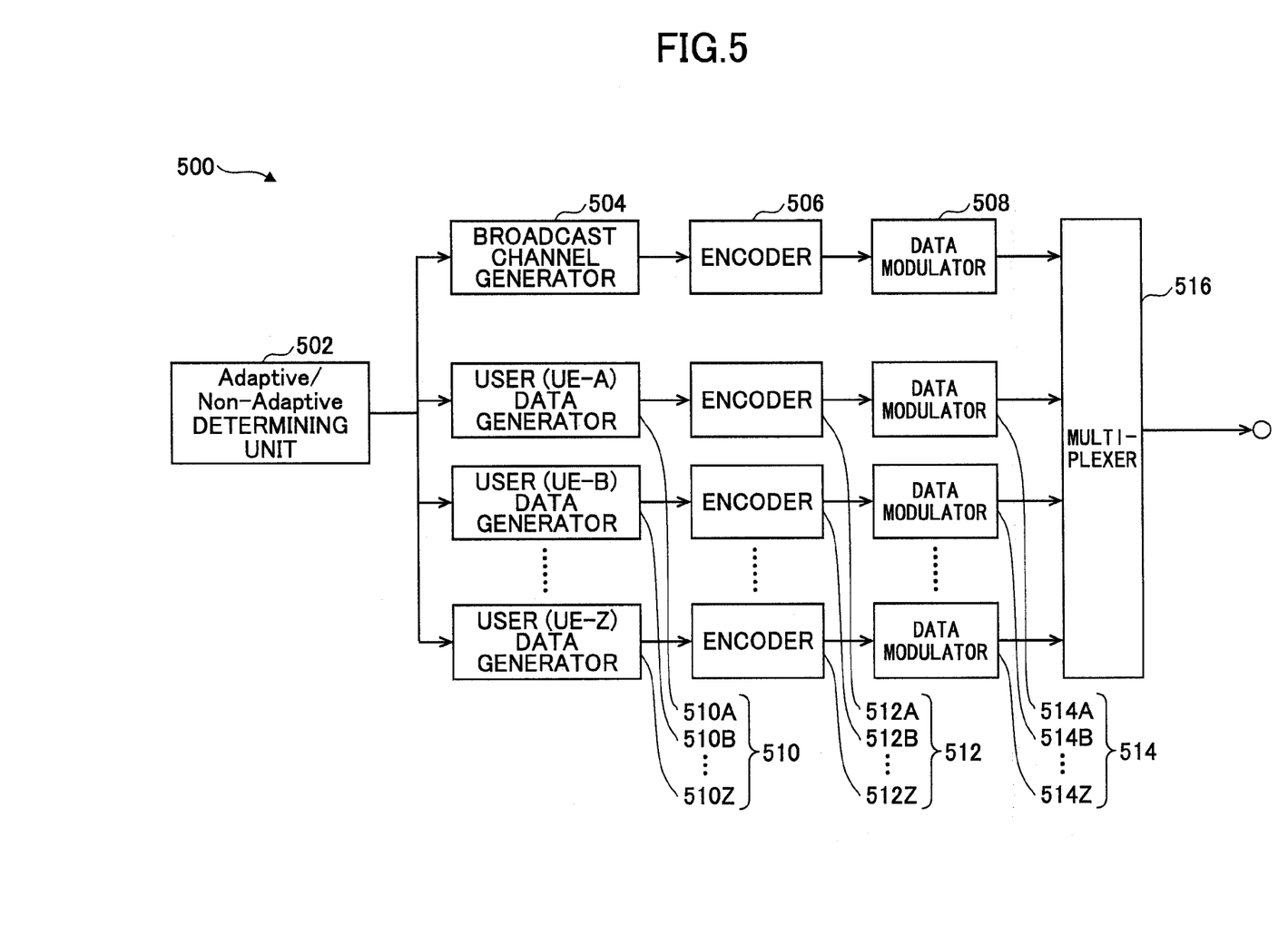
FIG. 5 is a schematic block diagram illustrating a configuration of a transmitter of a base station according to another embodiment of the present invention.

With reference to FIG. 5, a configuration of a base station according to a second embodiment of the invention is explained briefly.

A base station 500 according to the second embodiment is different from the base station 500 according to the first embodiment as follows: in other words, while the adaptive/non-adaptive determining unit 404 of the base station 400 according to the first embodiment is arranged to determine for each TTI whether adaptive ARQ or non-adaptive ARQ is to be applied, an adaptive/non-adaptive determining unit 502 in the base station 500 according to the second embodiment also determines for each cell or for each user which one of the above is to be applied.

As shown in FIG. 5, the base station 500 includes an adaptive/non-adaptive determining unit 502, a broadcast channel generator 504, an encoder 506, a data modulator 508, user data generators 510, encoders 512, data modulators 514, and a multiplexer 516.

The adaptive/non-adaptive determining unit 502 determines whether the adaptive ARQ or the non-adaptive ARQ is to be applied. For example, when there are a large number of users in an outer edge area of a cell, when a cell covered by the base station 500 is large, etc., the determining unit 502 selects a method in which a radio resource grant is not transmitted (non-adaptive ARQ), choosing to transmit either one of "+1" (ACK) and "−1" (NACK) as ACK/NACK information. Upon selecting the above, the determining unit 502 outputs an instruction signal to the broadcast channel generator 504 in order to report to all users in the cell that the non-adaptive ARQ is selected. The broadcast channel generator 504, to which the instruction signal is input, generates the information and outputs the generated information to the data modulator 508.

On the other hand, when the determining unit 502 determines that the adaptive ARQ is to be applied to a user A (UE-A) out of multiple users (UE-A to UE-Z) within a cell, the determined result is output to the user data generator 510A for the UE-A. The user data generator 510A, to which the determined result is input, generates information indicating the determined result, and outputs the generated information to the data modulator 514A.

The data modulator 508 or the data modulator 514A (or one of the data modulators 514B-514C) modulates the input information and outputs the modulated input information to the multiplexer 516. The multiplexer 516 generates, through multiplexing, a signal to be transmitted to the mobile station, which signal is output to an RF transmit circuit (not shown), and transmitted to the base station via a power amplifier and a duplexer (neither shown).

As described above, the second embodiment makes it possible to apply the non-adaptive ARQ to all users within a cell, for example, according to the determined result. In this case, a transmit header can be shortened, so that transmission is made possible with relatively low transmit power and becomes beneficial when there are a large number of users in an outer edge area of a cell, or when a cell is large.

A Third Embodiment

Figure 6:
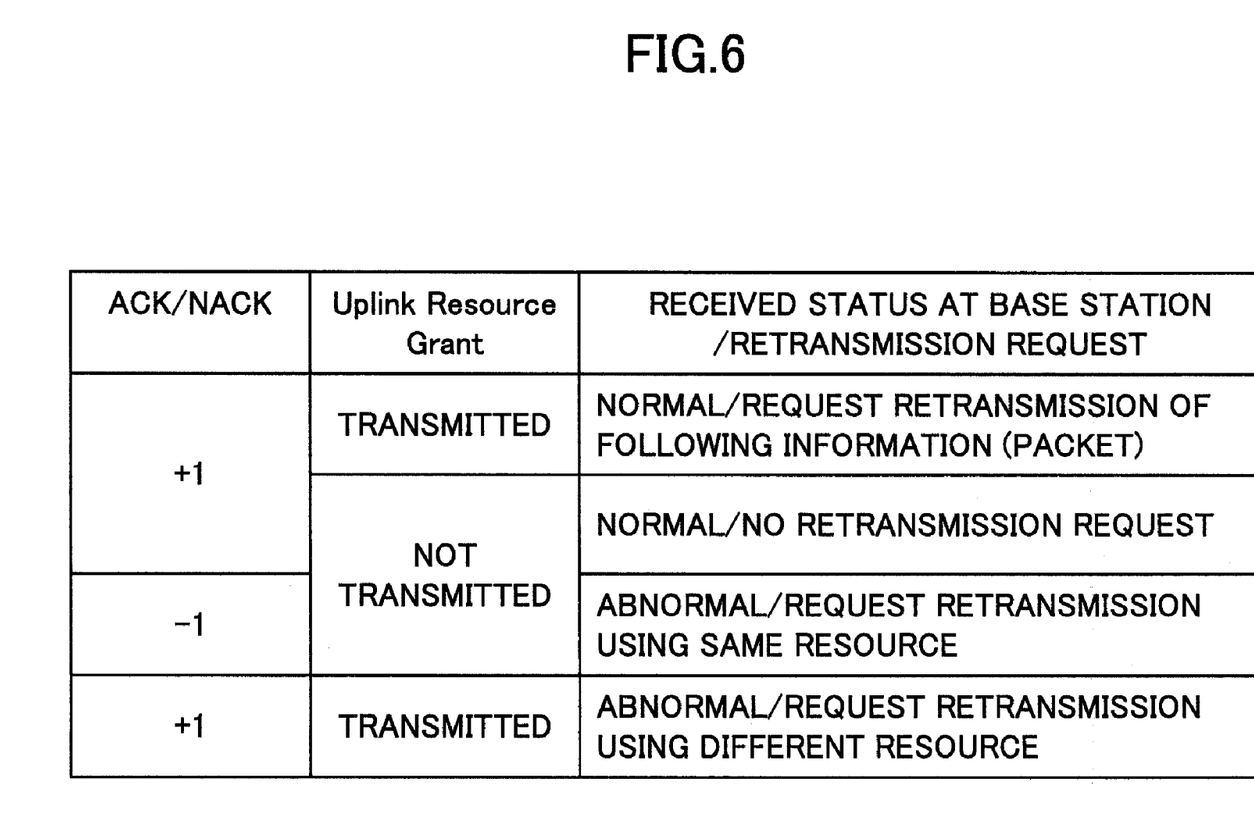
FIG. 6 is a chart illustrating a signaling method for ACK/NACK and uplink resource allocation according to another embodiment of the present invention.

As a third embodiment of the present invention, a variation of the first embodiment is explained. The third embodiment differs from the first embodiment in that the base station transmits "+1" as ACK when information (a packet) from the mobile station is normally received and it transmits a radio resource grant to request for following information (a following packet) and is the same with respect to the other features, etc. Below, with reference to FIGS. 6 and 7, the present embodiment is explained, primarily with respect to differences with the first and second embodiments.

In step S71 (FIG. 7), when reception from a mobile station is determined to be normal (YES), it is determined whether a request for transmitting following information (a following packet) is to be made to the mobile station (step S72). For example, when there is no information to be transmitted at the mobile station, it is determined that the above request is not made (step S72: NO). In this case, only "+1" which indicates that it is an ACK is transmitted from the base station (step s74).

Figure 7:
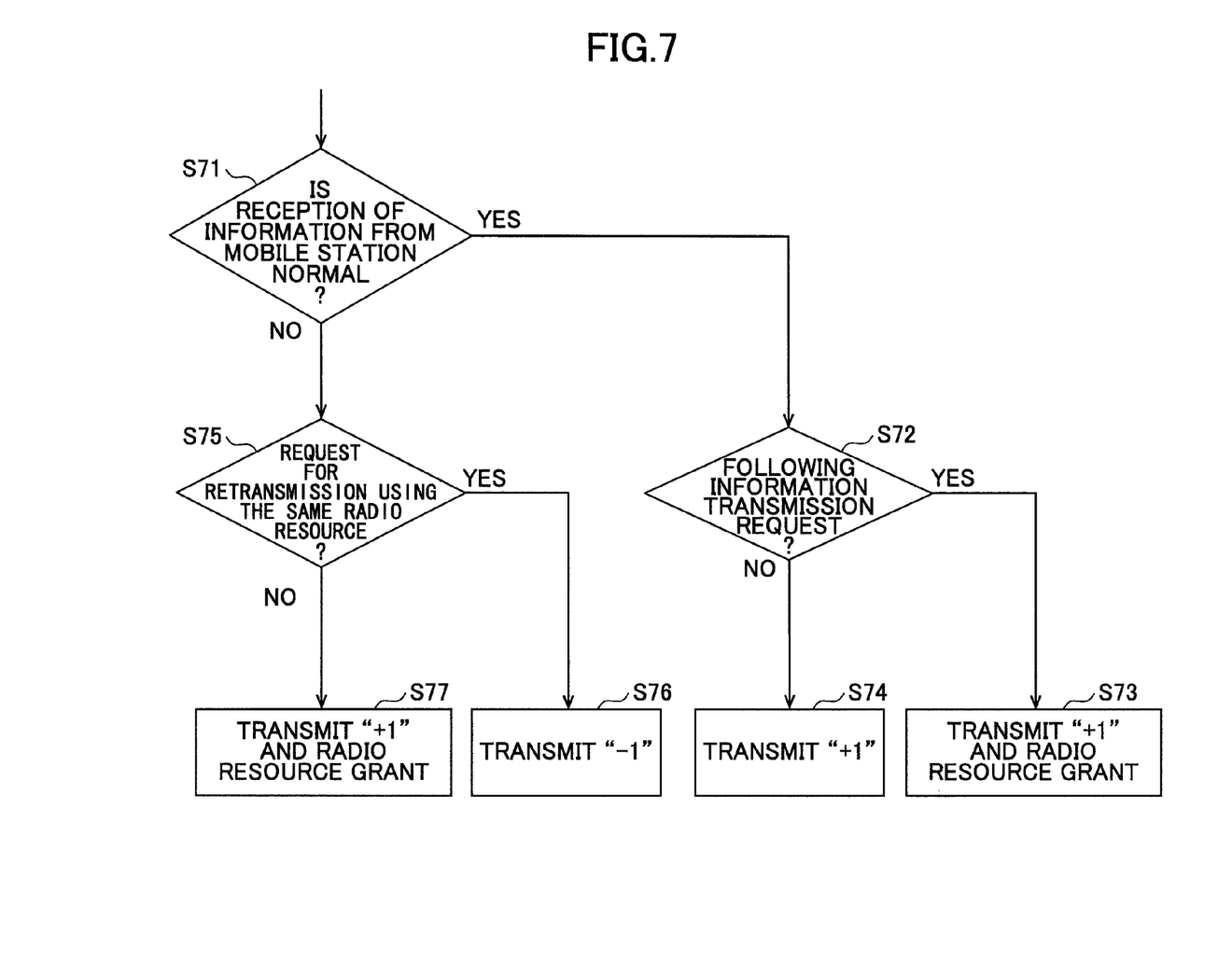
FIG. 7 is a flow chart explaining the signaling method in FIG. 6.

On the other hand, in step S72, when the base station determines that it is to request the mobile station to transmit following information (YES), "+1" as ACK, and a radio resource grant which indicates a radio resource to be used by the mobile station to transmit the following information are transmitted to the mobile station (step S73).

In either case, the mobile station determines whether the ACK ("+1") is received and the radio resource grant is transmitted. Upon determining that the transmission is made, the mobile station, rather than retransmitting already-transmitted information, transmits following information (a packet) according to radio resource information included in the radio resource grant. Moreover, the mobile station can discard already-transmitted information stored within a buffer when a signal requesting new information transmission is recognized.

On the other hand, when the presence of the radio resource grant is not determined, the mobile station terminates the transmission operation.

As described above, the third embodiment is beneficial in that, in addition to the advantage of the first embodiment as described above, the mobile station can recognize, almost at the same time as receiving ACK that following information is to be transmitted. Moreover, it is beneficial for the base station in that it does not have to separately transmit a signal requesting following information to be transmitted.

While the present invention is described with reference to a number of embodiments, the present invention is to not be limited to the disclosed embodiments, so that various variation and changes within the scope of the claimed invention is possible.

For example, while a base station has been used as an example to explain the above embodiment, an embodiment of the present invention may be embodied as a mobile station. In other words, the mobile station may be arranged to generate "+1" when reception of information from the base station is normal; to generate "−1" when reception of information from the base station is abnormal (step s76), so that a base station is instructed to retransmit information using a radio resource used in previous transmission (step s75); and to generate "+1" and a radio resource grant (step s77) when reception of information from the base station is abnormal and a base station is instructed to retransmit information using a radio resource different from a previously used radio resource (step s75).

The invention claimed is:

1. A method of controlling communications, comprising:
a step of determining whether reception of information from a mobile station is normal;
a step of generating a first signal when reception of information is determined to be normal,
generating a second signal when reception of information is determined to be abnormal and when the mobile station is instructed to retransmit information using a first radio resource used in previous transmission and
when reception of information is determined to be abnormal and when the mobile station is instructed to retransmit the information using a second radio resource different from the first radio resource, generating the first signal, and a third signal including information on the second radio resource; and
a step of transmitting any one of the first signal, the second signal, and a combination of the first signal and the third signal, the first signal, and the second signal, and the combination of the first signal and the third signal being generated by the step of generating,
wherein the step of generating further includes a step of generating, when reception of information is determined to be normal, in addition to the first signal, a fourth signal for reporting, to the mobile station, a third radio resource to be used in following transmission.

2. A signal generating apparatus, comprising:
a first signal generator which generates a first signal when reception of information from a transmission source is normal;
a second signal generator which, when the reception of the information from the transmission source is abnormal and the transmission source is instructed to conduct retransmission of the information using a first radio resource used in previous transmission, generates a second signal for instructing the retransmission;
a third signal generator which, when the reception of the information from the transmission source is abnormal and the transmission source is instructed to retransmit the information using a second radio resource different from the first radio resource, generates the first signal and a third signal including information on the second radio resource; and
a fourth signal generator which, when the reception of the information from the transmission source is normal, generates, in addition to the first signal, a fourth signal for reporting to the transmission source a third radio resource to be used in following transmission.

3. A radio communications apparatus, comprising:
a first signal generator which generates a first signal when reception of information from a transmission source is normal;
a second signal generator which, when the reception of the information from the transmission source is abnormal and the transmission source is instructed to conduct retransmission of the information using a first radio resource used in previous transmission, generates a second signal for instructing the retransmission;
a third signal generator which, when the reception of the information from the transmission source is abnormal and the transmission source is instructed to retransmit the information using a second radio resource different from the first radio resource, generates the first signal and a third signal including information on the second radio resource;

a fourth signal generator which, when the reception of the information from the transmission source is normal, generates, in addition to the first signal, a fourth signal for reporting to the transmission source a third radio resource to be used in following transmission; and a transmitter which transmits one of the first signal, the second signal, and a combination of the first signal and the third signal, the first signal and the second signal and the combination of the first signal and the third signal being generated by the signal generating apparatus.

* * * * *